United States Patent [19]

Murai et al.

[11] Patent Number: 4,672,456
[45] Date of Patent: Jun. 9, 1987

[54] AUTOMATIC FOCUSING DEVICE OF VIDEO CAMERA

[75] Inventors: Yoshio Murai, Kawasaki; Kazuo Shiozawa; Masaki Shimada, both of Hachioji, all of Japan

[73] Assignee: Konishiroku Photo Industry Co., Ltd., Tokyo, Japan

[21] Appl. No.: 702,466

[22] Filed: Feb. 19, 1985

[30] Foreign Application Priority Data

Mar. 2, 1984 [JP] Japan .................. 59-38803

[51] Int. Cl.$^4$ .............................. H04N 3/26
[52] U.S. Cl. .................... 358/227; 354/402
[58] Field of Search ............. 358/227; 354/402, 403, 354/404

[56] References Cited

U.S. PATENT DOCUMENTS

| | | | |
|---|---|---|---|
| 4,354,204 | 10/1982 | Kimura | 358/227 |
| 4,392,726 | 7/1983 | Kimura | 358/227 |
| 4,422,097 | 12/1983 | Inuiya | 358/227 |
| 4,470,676 | 9/1984 | Konoshita | 358/227 |
| 4,531,158 | 7/1985 | Murakami | 358/227 |

FOREIGN PATENT DOCUMENTS 59-4378  1/1984  Japan .................. 358/227

Primary Examiner—Gene Z. Rubinson
Assistant Examiner—L. C. Schroeder
Attorney, Agent, or Firm—Jordan B. Bierman

[57] ABSTRACT

An apparatus and method for the automatic focussing of a video camera having a camera circuit for generating electric image signals corresponding to the brightness of an object, a circuit for sampling at least two sampling signals from the electric image signal, an A/D converter for obtaining at least one inclination value corresponding to at least one pair of the sampling signal, and a stop for stopping a focussing lens when at least one of the inclination values exceeds a predetermined value.

10 Claims, 8 Drawing Figures

AUTOMATIC FOCUSING DEVICE OF VIDEO CAMERA

BACKGROUND OF THE INVENTION

1. Field of the Invention

The present invention relates to an automatic focusing device of a video camera capable of quick and accurate focusing.

2. Description of the Prior Art

Hitherto, various types of automatic focusing systems for a video camera have been known and one of them is an automatic focusing system of a television camera disclosed in Japanese Patent Examined Publication No. 5265/1964. In this system, the high frequency component is extracted, through a high-pass filter, from image signals obtained while the focusing lens is moved for focusing and when the level of the high frequency component arrives at its peak, the focusing is judged to be finished, thus the system is generally called "a mountain-climbing method".

In this "mountain-climbing method" as it is called, the detection of the peak level of the image signal may only be done immediately after the peak level while the focusing lens is moved. Therefore, even if the focusing lens is stopped concurrently with the detection of the peak level, the position of the lens is already ahead of the right position of focusing and the lens thereby needs to be moved back in the reverse direction. When the lens is moved back in the reverse direction as mentioned above, the right position of focusing is determined at the point of time when another arrival of the high frequency component of image signals at its peak level is detected. (Such phenomenon is called the hunting phenomenon.) In this case, the image screen becomes obscure.

Further, in the aforesaid "mountain-climbing method", the blurred image caused by an erroneous focusing can not be judged as it is blurred unless the motor for moving the focusing lens is driven, thus there is a possibility that the blurred image continues to appear when the subject is at a standstill.

SUMMARY OF THE INVENTION

Object and Structure of the Invention

The present invention has been devised considering the aforesaid points and its object is to provide an automatic focusing device for a video camera capable of a quick and accurate focusing. In order to attain the aforesaid object, the present invention has the structure wherein a sampling of image signals produced from a video camera to form a picture is made along the distance-measurement line provided on the screen in advance while the focusing lens is being moved, the brightness distribution is processed based on the sampled image signals and the judgment for being in focus is made when the inclination of the brightness distribution has exceeded the prescribed value, thus the focusing lens is stopped.

EXAMPLES

Figure 1A:
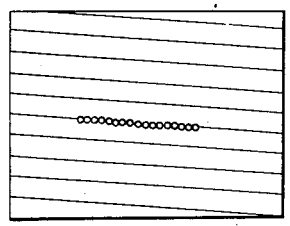
FIG. 1a and b show two different examples of a distance-measurement line used in the judgment for being in focus in the present invention.

Referring to the drawings, the present invention will be explained as follows.

In the present invention, it is possible to judge with the inclination of the brightness level of image signals, without moving the focusing lens back and forth, whether being in focus or not owing to the fact that the inclination of the image signals becomes steep near the point of being in focus when the waveform is observed on an oscilloscope.

Figure 1B:
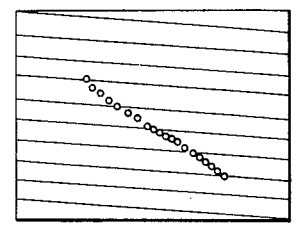
Figure 2:
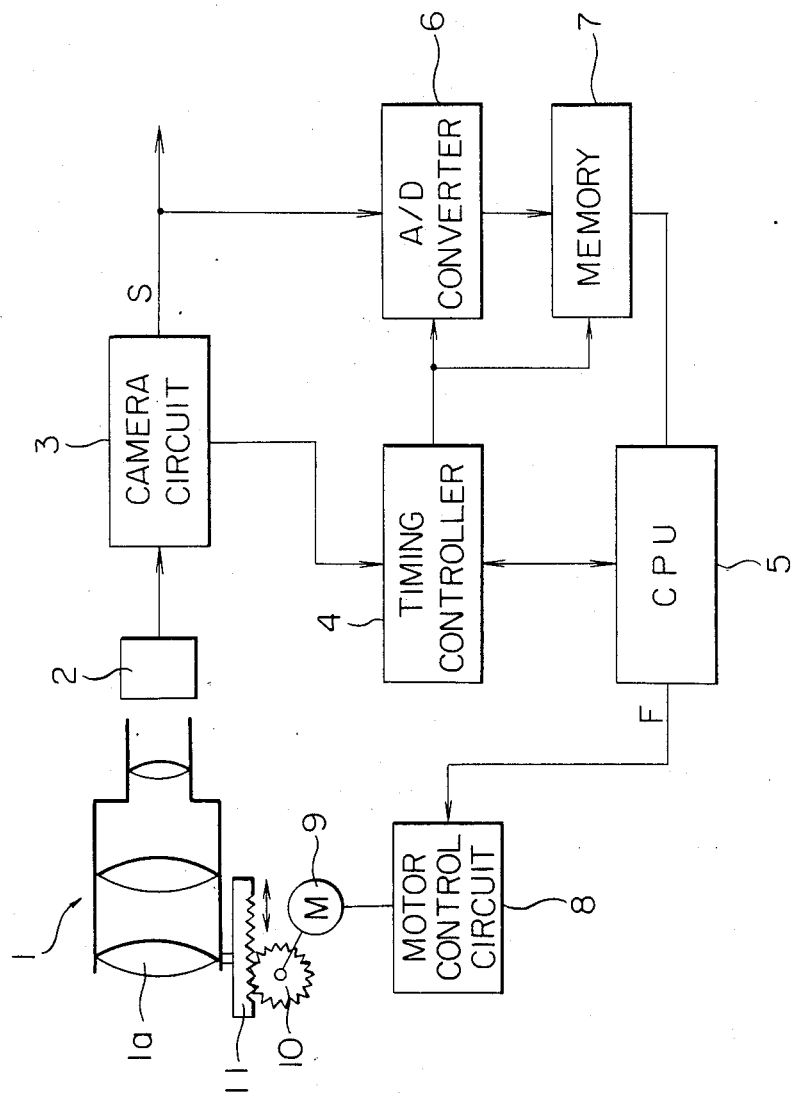
FIG. 2 is a block diagram of an example of the automatic focusing device of a video camera concerning the present invention.

Now, FIG. 1 shows two different distance-measurement lines used for the judgment of being in focus in the present invention and the continuous picture elements each of which is shown as a small circle in the figure is defined as a distance-measurement line and the inclination of the brightness level of the image signals represented by the distance-measurement line is to be detected and (a) in the figure shows a measurement line provided on a scanning line while (b) shows a distance-measurement line crossing plural scanning lines. The distance-measurement line may be moved on the screen and when there is no brightness information along a certain distance-measurement line, the distance-measurement line may be moved within a range and if there is a brightness information in the range, the automatic focusing can be done. FIG. 2 shows a block diagram of a video camera equipped with an automatic focusing device of the present invention, and 1 in the diagram is a lens system having a focusing lens 1a, 2 is a camera tube, 3 is a camera circuit that processes the image signals produced from the camera tube 2, 4 is a timing controller that controls the timing of automatic focusing actions based on the synchronizing signal produced in the camera circuit 3 and on various signals from a horizontal transfer pulse and CPU 5, 6 is an A/D converter that converts image signals S produced from the camera circuit 3 to a digital form, 7 is a memory wherein the image signals on the prescribed distance-measurement line among the A/D converted image signals S are stored, 8 is motor control circuit that controls driving and stopping of the focusing lens driving motor 9 based on the judgment result for the inclination of the brightness level of the image signals processed by CPU 5 and 10 is a focusing lens-driving gear whose rotation causes the rack 11 to move in the directions of arrows and the focusing lens 1a mounted on the rack 11 to move from side to side accordingly.

Figure 3:
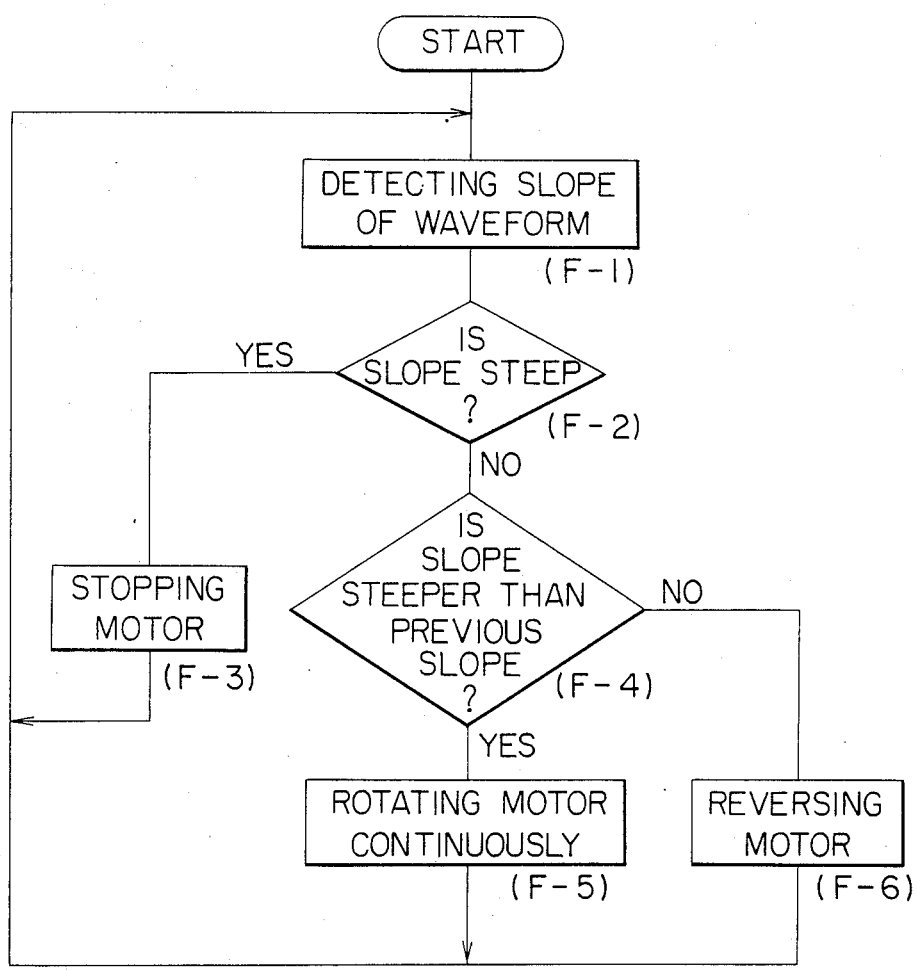
FIG. 3 is a flow chart of automatic focusing actions in the present invention.

FIG. 3 is a flow chart of automatic focusing actions in the automatic focusing device of the present invention shown in FIG. 2, wherein CPU 5 first checks the inclination of variation in the brightness levels with use of the image signals stored in the memory 7 (F-1), then the judgment is made whether the aforesaid inclination is steeper than the prescribed value or not (F-2) and if it is steeper, the automatic focusing driving motor 9 is stopped (F-3) on the basis of being in focus, while if it is not steeper, further judgment may be made (F-4) whether it is becoming steeper or not. As a result, when it is becoming steeper than the previous frame, the motor 9 is caused to keep running (F-5) on the basis of being approaching to the position of being in focus while in another case, the motor 9 is caused to run reversely (F-6) on the basis of going away from the position of being in focus.

Figure 4:
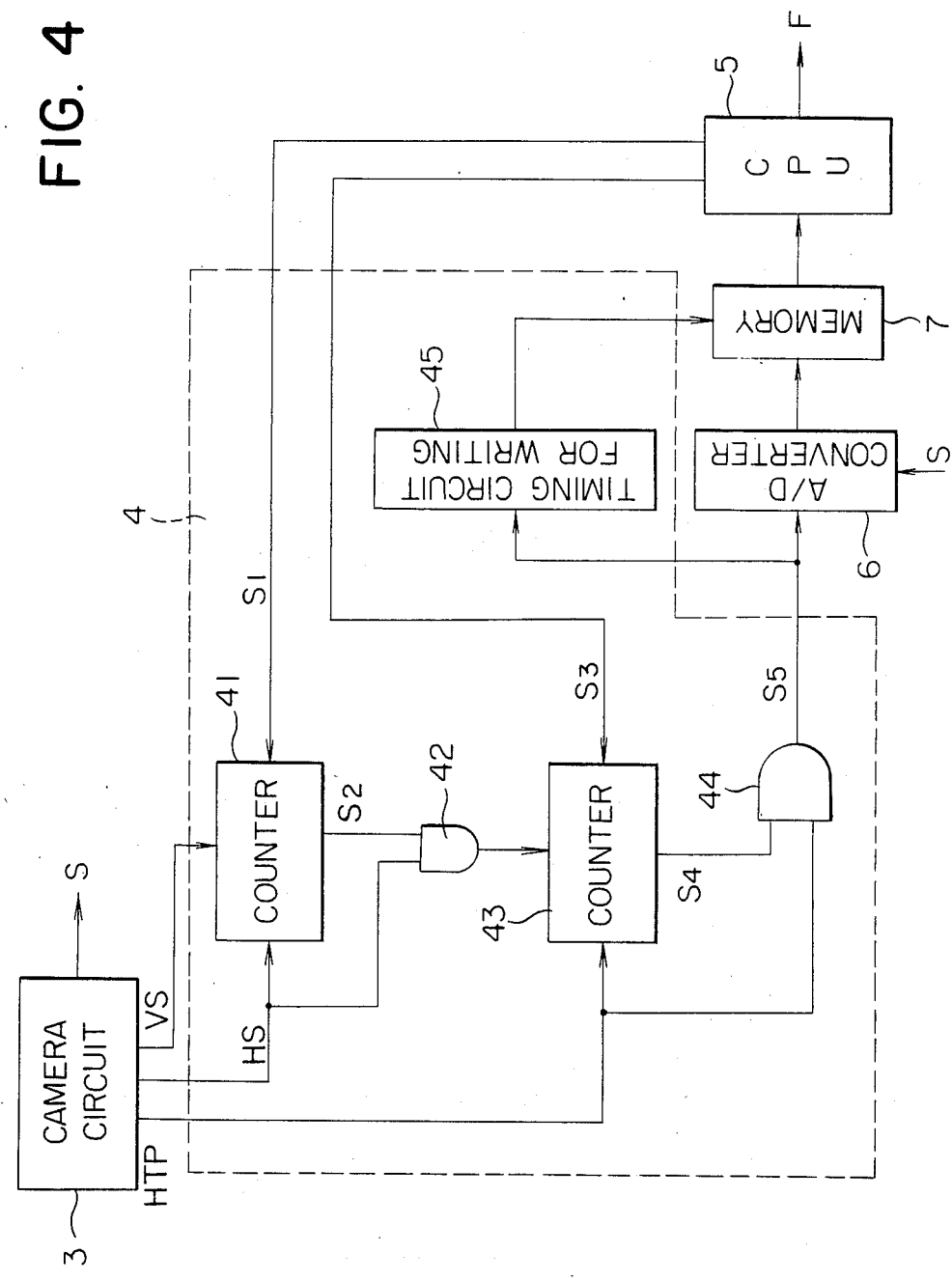
FIG. 4 is a block diagram of an example of a timing controller used for the automatic focusing device shown in FIG. 2, FIG. 5(a) and (b) are the diagrams illustrating the fetching action for the image data on the distance-measurement line in the automatic focusing device of the present invention

FIG. 4 is an example of the timing controller shown in FIG. 2 wherein the judgment for being in focus is made with use of the distance-measurement line in FIG. 1(a).

The timing controller 4 (enclosed with a dotted line) consists of the counter 41 that receives horizontal synchronizing signals HS and vertical synchronizing signals VS both from the camera circuit 3 as well as distance-measurement line setting signals $S_1$ from CPU 5, the AND circuit 42 that takes horizontal synchronizing signals HS AND output of the counter 41, the counter 43 that receives the output from the AND circuit 42, horizontal transfer pulses HTP from the camera circuit 3 and distance-measurement starting position-setting signals $S_3$ from CPU 5 and then produces distance-measurement line signals $S_4$, the AND circuit 44 that takes horizontal transfer pulses HTP AND the counter 43 and the writing timing circuit 45 that commands the writing of image signals in the memory 7 and produces the writing address. Horizontal transfer pulses HTP are generated from the synchronizing signal-generating circuit in the camera circuit 3.

Circuit operations will be explained next.

Figure 5A:
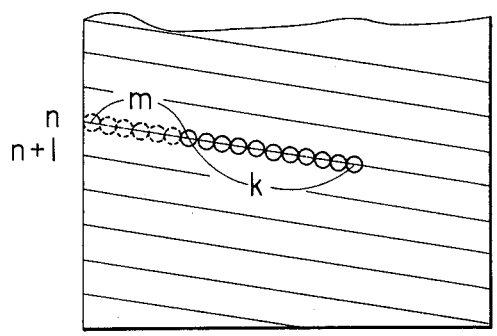

FIG. 5(a) and (b) are the enlargement of a part in each of FIG. 1(a) and (b) wherein FIG. 5(a) corresponds to the example in FIG. 4.

The counter 41 is reset with every vertical synchronizing signal VS and starts counting horizontal synchronizing signals HS. When the value counted by the counter 41 becomes equal to the distance-measurement line-setting signal $S_1$ inputted from CPU 5, a coincidence signal $S_2$ is produced from the counter 41. The distance-measurement line-setting signal $S_1$ is a signal for setting a scanning line number (e.g., n) which will determine a distance-measurement line. Such distance-measurement line may be moved in the horizontal direction on a picture screen by changing the signal $S_1$. When coincidence signal $S_2$ is produced from counter 41, an AND condition is established in AND circuit 42 by horizontal synchronizing signals HSn generated at the moment of the commencement of scanning with the scanning line for setting the distance-measurement line and counter 43 is then set so that horizontal transfer pulses HTP are commenced to be computed. On the other hand, to counter 43 is inputted from CPU 5 a starting position-setting signal $S_3$ for setting a distance-measurement starting position (for setting from, e.g., the mth pulse of the horizontal transfer pulses), therefore, when a value counted by output $S_4$ of counter 43 coincides with the starting position setting signal $S_3$(m), the output $S_4$ is changed from an "L" level as it was into an "H" level, and is thereafter restored from the "H" level into the "L" level again when horizontal transfer pulses HTP are counted by counter 43 up to a value (e.g., a value k) preset inside the counter. The horizontal transfer pulses HTP are, therefore, transmitted, to serve as distance-measurement signals $S_5$, to A/D converter 6 and writing timing circuit 45, respectively, after passing through AND circuit 44, for a period that output $S_4$ of counter 43 is kept at an "H" level. Thus, the position and length of a distance-measurement line in the horizontal direction [a portion indicated by the small circular marks in a row shown in FIG. 1(a)] can be determined according to a starting position setting signal $S_3$(m) given from CPU 5 and a preset value (k) of counter 43 in itself.

In the A/D converter 6, an image signal S is converted into A/D or vice versa with an inputting timing of horizontal transfer pulse HTP inputted as a signal $S_5$ and memory 7 is written in according to a writing signal given from writing timing circuit 45 and an address data.

CPU 5 will compute a luminance distribution by means of image signal S written in memory 7, and compare an inclination value of the luminance distribution with a prescribed value so that it will detect a steep variation exceeding the prescribed value. There may be various methods of computing the luminance distribution. For example, there is a method of computing inclinations in order from the differences between the luminance levels of the image signals corresponding to every several horizontal transfer pulses among the image signals written in memory 7. When the steepest variation point is detected by CPU 5, the point is judged as the focal point so that an in-focus signal F is sent out of CPU 5 and thereby a motor stopping signal is sent out of motor control circuit 8 (See FIG. 2) so as to stop motor 9 moving focusing lens 1a.

The above-mentioned description is of the case in which a distance-measurement is set on a specific scanning line. If it is difficult to bring a point into focus on the distance-measurement line, the point is brought into focus in the manner that the distance-measurement line is moved up or down in the vertical direction of a picture screen by changing distance-measurement setting signal $S_1$ given from CPU 5 and, at the same time, the distance-measurement line is moved in the horizontal direction of the picture screen by changing starting position setting signal $S_3$ given from CPU 5, so that a focusing operation can be performed by moving a distance-measurement area on the picture screen. In this way, even if a solid color wall is photographed, it can be brought into focus provided that there is a small foreign matter such as a dust on the wall projected on the picture screen. Such a distance-measurement area can be moved according to a program.

To the above-mentioned example, an A/D converter capable of high-speed processing should be provided, because a distance-measurement line is set on a scanning line and image signals are converted into A/D and vice versa in succession to write in a memory.

Figure 6:
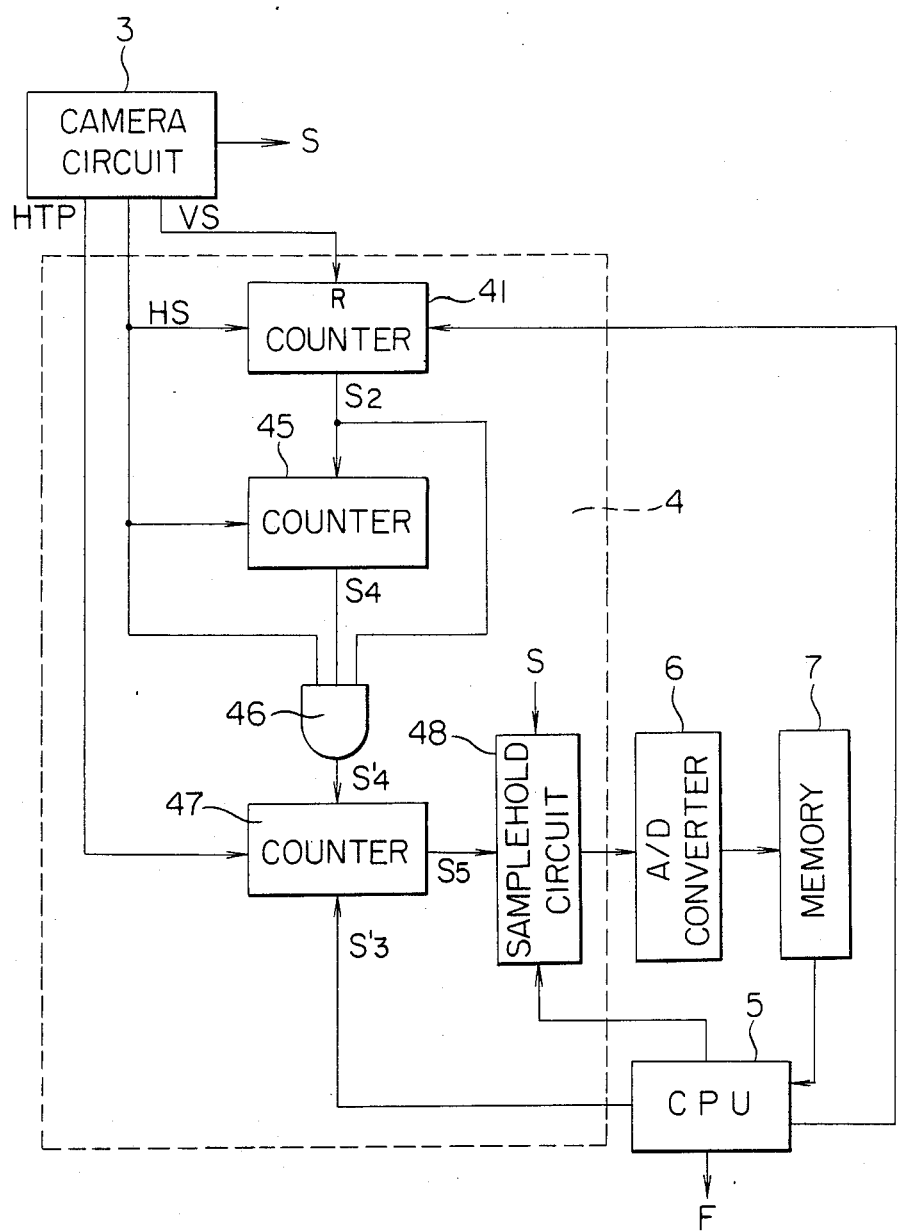
FIG. 6 is a block diagram of the other example of a timing controller used in the automatic focusing device shown in FIG. 2.

FIG. 6 illustrates another example of the timing controller shown in FIG. 2, in which a judgment of whether an image is in focus or not is made by the distance-measurement line shown in FIG. 1(a).

Timing controller 4 (enclosed with a broken-line) comprises counter 41 for receiving a horizontal synchronizing signal HS and a vertical synchronizing signal VS each given from camera circuit 3; a counter 45 which is set by an output of counter 41 so as to count the horizontal synchronizing signal HS; an AND circuit 46 for taking a logical multiplication of an output of counter 41, an output of counter 45 and a horizontal synchronizing signal HS; a counter 47 which is set by an "H" output of the AND circuit 46 so that horizontal transfer pulses HTP of camera circuit 3 may be computed according to distance-measurement starting position setting signal $S'_3$ of CPU 5 and then distance-measurement signal $S_5$ may be sent out; and a sample-hold circuit 48 for holding an image signal S for only a period approximate to a horizontal synchronizing time.

Figure 5B:
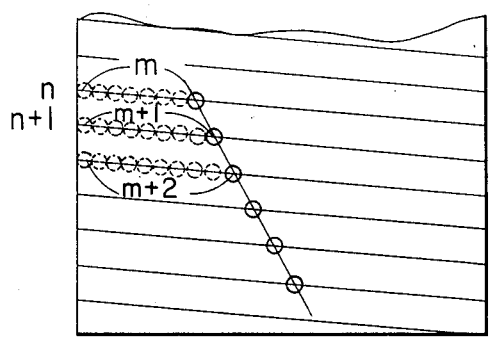

Next, the circuit operations will be described with reference to FIG. 5(b).

In this example, as is similar to the above described example, counter 41 will sent out a coincidence signal $S_2$ when it computes horizontal synchronizing signals HS on a picture screen up to n number of scanning lines for determining the uppermost position of the distance-measurement line. Counter 45 commences to compute horizontal synchronizing signal HS after being set by the signal $S_2$ and then sends out "H" signals until when the counted value amounts to the number of scanning lines for determining the lowermost position of the distance-measurement line. Consequently, AND circuit 46 sends out "H" signal $S'_4$ for every scanning line between the uppermost position of the distance-measurement line and the lowermost position thereof. Counter 47 is set by the signal $S'_4$ in every starting position of the scanning lines transversing the distance-measurement lines and is then commenced to compute horizontal transfer pulses HTS. In other words, counter 47 will commence to compute the horizontal transfer pulses HTP when it receives a horizontal synchronizing signal HSn of the nth scanning line positioned uppermost of the distance-measurement line, and at the moment when the counted value coincides with a distance-measurement starting position setting signal $S'_3(m)$ given from CPU 5, the counter 47 sends out distance-measurement signal $S_5$ only for that moment, and image signal S of that moment is taken and held in sample-hold circuit 48, and thereafter the signal S is converted into A/D to be written in memory 7 by means of an A/D converter 6.

The next scanning line (n+1) transversing the distance-measurement line is inputted from CPU 5 with a distance-measurement starting position setting signal $S'_3$ which is delayed, at this time longer than the case of the previous scanning line, for a single horizontal transfer pulse time, (m+1). As a result therefrom, at the moment when a value counted by counter 47 amounts to (m+1), it sends out distance-measurement signals $S_5$ for only the period of the moment so that the image signals S for that moment may be taken to be held in sample-hold circuit 48 and may thereafter be converted into A/D within a period of a single horizontal synchronizing and may then be written in memory 7. With respect to the next scanning line (n+2), as is similar to the former case, when a value counted by counter 47 amounts to a value which is a further increase of the value of a single horizontal transfer pulse, (m+2), memory 7 is written in by a data of image signal S converted into A/D.

Thus, image signals S are written similarly in memory 7 by counter 45 according to the prescribed number of scanning lines, and during these operations, CPU 5 computes luminance distributions according to the prescribed program, with the use of image signals stored in memory 7, and detects the changes of the inclination of the distributions. Resultantly, an in-focus signal F is sent out when the inclination changes to be the steepest, that is, in focus. Upon receipt of this signal F, motor control circuit stops auto-focus lens driving motor 9 in motion.

In this example also, as is similar to the example shown in FIG. 4, distance-measurement line can arbitrarily be changed on a picture screen by changing timewise a distance-measurement line setting signal $S_1$ and a distance-measurement starting position setting signal $S'_3$ each given from CPU 5 in accordance with a prescribed program.

This example was so arranged that a distance-measurement line transversed a plurality of scanning lines to take in only image signals corresponded to one horizontal transfer pulse from every scanning line. It is, therefore, possible to process with an A/D converter of a lower speed as compared with that of the first example. It is also allowed to use color-signals in place of luminance-signals, for an in-focus judgment.

As described above, in this invention, image signals so put out from a video camera as to form a picture are sampled, along a distance-measurement line prescribed on the picture, with moving a focusing-lens; and the focusing-lens is stopped to move as it is judged to be in focus when exceeding a prescribed value of the luminance-signal inclinations of the sampled image signals. Accordingly, it does not cause any of such an occasion as that a picture becomes out of focus and hard to see before the picture is brought into focus. And, there is no such an occasion that a series of pictures is out of focus continuously even if a still subject is photographed, because an erroneous distance-measurement is eliminated. According to this invention, no high-pass filter is not needed to use and a picture can be brought into focus even without moving a focusing lens back and forth.

What is claimed is:

1. An automatic focusing method for video cameras comprising generating electric image signals corresponding to the luminance of an object,
    sampling at lesat two picture element signals present on a predetermined distance-measurement line of said electric image signals,
    obtaining luminance inclination values of at least one pair of said sampled picture element signals through a signal digitized by an A/D converting means, and
    stopping a focusing lense in a focused image position when at least one pair of said luminance inclination values exceeds a predetermined value.

2. The method of claim 1 wherein said image signals are generated by a camera circuit of said video camera.

3. The method of claim 2 wherein said image signals are synchronized with vertical synchronizing signals, horizontal synchronizing signals, and horizontal transfer pulses, all of which are generated by said camera circuit.

4. The method of claim 3 wherein timing of said sampling is determiend by counting said horizontal synchronizing signals.

5. The method of claim 4 wherein timing of said sampling is determined by counting said horizontal transfer pulses.

6. The method of claim 3 wherein said sampling signals are sampled from one of horizontal scanning lines.

7. The emthod of claim 3 wherein said sampling signals are sampled from a plurality of horizontal scanning lines.

8. The method of claim 1 further comprising, converting said sampling signals to digitized sampling signals, and storing said digitized sampling signals in a memory, said digitized sampling signals being used for obtaining said inclination value.

9. An automatic focusing method for a video camera which comprises generating electric image signals corresponding to color of an object, sampling at least two sampling signals from said image signals, obtaining at least one inclination value corresponding to at least one pair of said sampling signals, and stopping a focusing lens when at least one said inclination value exceeds a predetermined value.

10. An automatic focusing apparatus for a video camera comprising means for generating electric image signals corresponding to brightness of an object, means for sampling at least two sampling signlas from said image signals, means for obtaining at least one inclination value corresponding to at least one pair of said sampling signals, and means for stopping a focusing lens when at least one of said inclination value exceeds a predetermined value.

* * * * *